US012743368B2

(12) United States Patent
Fultheim et al.

(10) Patent No.: US 12,743,368 B2
(45) Date of Patent: Sep. 22, 2026

(54) CACHE BASED MEMORY ACCESS TRACKING

(71) Applicant: HUAWEI TECHNOLOGIES CO., LTD., Shenzhen (CN)

(72) Inventors: Shai Fultheim, Hod Hasharon (IL); Rui Yang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/814,197

(22) Filed: Aug. 23, 2024

(65) Prior Publication Data

US 2024/0419582 A1 Dec. 19, 2024

Related U.S. Application Data

(63) Continuation of application No. PCT/CN2022/077473, filed on Feb. 23, 2022.

(51) Int. Cl.
*G06F 12/02* (2006.01)

(52) U.S. Cl.
CPC ................................ *G06F 12/0223* (2013.01)

(58) Field of Classification Search
CPC ...... G06F 12/02; G06F 12/00; G06F 12/0246; G06F 12/0223; G06F 2201/81;
(Continued)

(56) References Cited

U.S. PATENT DOCUMENTS 10,387,329 B2 8/2019 Chang
11,204,878 B1 12/2021 Pusdesris et al.
(Continued)

FOREIGN PATENT DOCUMENTS

CN 102467453 A 5/2012
CN 103455443 A 12/2013
(Continued)

OTHER PUBLICATIONS

C. Wang and C. Xu, "Statistical Wear-Leveling for Phase Change Memory," 2020 China Semiconductor Technology International Conference (CSTIC), Shanghai, China, 2020, pp. 1-3.*
(Continued)

*Primary Examiner* — Pierre Michel Bataille
(74) *Attorney, Agent, or Firm* — Leydig, Voit & Mayer, Ltd.

(57) ABSTRACT

An apparatus for executing a software program, comprising: a processing unit; a plurality of memory components, each connected to the processing unit and mapped to at least one range of memory addresses of a plurality of memory address ranges of the processing unit; and at least one memory tracking circuitry connected to the processing unit and to the at least one memory component. The memory tracking circuitry is configured for: in each iteration of a plurality of iterations, updating at least one statistical counter of a plurality of statistical counters in response to receiving a memory access command from the processing unit; and providing one or more of the plurality of statistical counters to a memory management component for the purpose of mapping application memory of the software program to the at least one memory component.

20 Claims, 9 Drawing Sheets

700

(58) Field of Classification Search
CPC .... G06F 2201/88; G06F 12/0284; G06F 3/06; G06F 3/0647; G06F 3/0658
See application file for complete search history.

(56) References Cited

U.S. PATENT DOCUMENTS

| | | | | |
|---|---|---|---|---|
| 2014/0223442 | A1 | 8/2014 | Eidus et al. | |
| 2017/0228322 | A1* | 8/2017 | Chang | G06F 3/061 |
| 2018/0046378 | A1 | 2/2018 | Coburn et al. | |
| 2018/0108404 | A1 | 4/2018 | Miura | |
| 2018/0150392 | A1 | 5/2018 | Booss et al. | |
| 2018/0314436 | A1 | 11/2018 | Basu et al. | |
| 2019/0087345 | A1* | 3/2019 | Hijaz | G06F 12/0897 |
| 2020/0050556 | A1* | 2/2020 | Yeap | G06F 12/0292 |
| 2021/0019050 | A1* | 1/2021 | Chen | G06F 3/0679 |
| 2021/0318900 | A1 | 10/2021 | Gopalan et al. | |
| 2022/0035735 | A1* | 2/2022 | Bhardwaj | G06F 12/0246 |
| 2023/0238046 | A1* | 7/2023 | Gieske | G11C 11/40611 365/222 |
| 2023/0333734 | A1* | 10/2023 | Miron | G06F 3/0653 |
| 2024/0403417 | A1* | 12/2024 | Jaleel | G06F 12/1458 |

FOREIGN PATENT DOCUMENTS

| | | | | |
|---|---|---|---|---|
| CN | 106354543 | A | 1/2017 | |
| CN | 107179949 | A | 9/2017 | |
| CN | 107239410 | A | 10/2017 | |
| CN | 109478139 | A | 3/2019 | |
| CN | 110275841 | A | 9/2019 | |
| CN | 108027765 | B | 6/2020 | |
| CN | 113297099 | A | 8/2021 | |
| JP | 2008090554 | A | 4/2008 | |
| JP | 2019506676 | A | 3/2019 | |
| KR | 20130022604 | A | 3/2013 | |
| KR | 20150082461 | A | 7/2015 | |
| WO | WO 2015132744 | A * | 9/2015 | H04L 41/082 |

OTHER PUBLICATIONS

Devavrat Shah, Sundar Iyer, Balaji Prabhakar and N. McKeown, "Analysis of a statistics counter architecture," HOT 9 Interconnects. Symposium on High Performance Interconnects, Stanford, CA, USA, 2001, pp. 107-111.*

F. Giraldeau, N. Ezzati-Jivan and M. R. Dagenais, "System execution path profiling using hardware performance counters," 2021 IEEE International Systems Conference (SysCon), Vancouver, BC, Canada, 2021, pp. 1-8.*

Agarwal et al., "Thermostat: Application-transparent Page Management for Two-tiered Main Memory," ASPLOS '17: Proceedings of the 22nd International Conference on Architectural Support for Programming Languages and Operating Systems, Total 14 pages (Apr. 8-12, 2017).

Carr et al., "WSCLOCK—A Simple and Effective Algorithm for Virtual Memory Management," SOSP '81, Proceedings of the 8th ACM symposium on Operating systems principles, Total 9 pages (Dec. 1981).

Zhou et al., "The Multi-Queue Replacement Algorithm for Second Level Buffer Caches," Proceedings of the 2001 USENIX Annual Technical Conference, Total 15 pages (Jun. 25-30, 2001).

Yan et al., "Nimble Page Management for Tiered Memory Systems," Session: VM/Memory, ASPLOS'19, Providence, RI, USA, total 15 pages (Apr. 13-17, 2019).

Meswani etal., "Heterogeneous Memory Architectures: A HW/SW Approach for Mixing Die-stacked and Off-package Memories," Total 11 pages (Mar. 2015).

Chazelle et al., "The Bloomier Filter: An Efficient Data Structure for Static Support Lookup Tables," SODA '04: Proceedings of the 15th annual ACM-SIAM symposium on Discrete algorithms, Total 10 pages (Jan. 2004).

* cited by examiner

301A
Range of memory addresses

301B
Range of memory addresses

301C
Range of memory addresses

301D
Range of memory addresses

301E
Range of memory addresses

301F
Range of memory addresses

301
Memory address ranges

120A
Memory Component

120B
Memory Component

120C
Memory Component

CACHE BASED MEMORY ACCESS TRACKING

CROSS-REFERENCE TO RELATED APPLICATIONS

This application is a continuation of International Application No. PCT/CN2022/077473, filed on Feb. 23, 2022, the disclosure of which is hereby incorporated by reference in its entirety.

BACKGROUND

The present disclosure relates to a computerized apparatus and, more specifically, but not exclusively, to a computerized apparatus having more than one memory component.

For brevity, henceforth the term "system" is used to mean a computerized system, and the terms are used interchangeably.

There exist myriad metrics for measuring performance of a computerized system, for example throughput, i.e. the amount of tasks performed in an identified time interval, and latency, i.e. the amount of time a task is delayed before it is performed. Improving a system's performance, for example by increasing the system's throughput, and additionally or alternatively reducing the system's latency, depends, among other factors, on an amount of computer resources available in the system and on how well various components of the system work together. For example, reducing latency when accessing memory, and additionally or alternatively increasing throughput of memory access, could improve performance of the system.

A memory component with relatively higher performance access characteristics, for example a low latency memory component or a memory component with high throughput, for example static RAM (SRAM), is typically more expensive than a memory component with lower performance access characteristics, for example dynamic RAM (DRAM). It is common practice to design a system's memory using more than one type of memory component, to balance between cost and performance of the system. Some common system designs organize a plurality of memory components in multiple tiers of memory, where a small and fast tier shadows a larger and slower tier, serving as a cache to the larger tier. In some designs there is a hierarchy of tiers, where only the largest tier is available for use by a software program, i.e. addressable using application memory addresses of the software program, and the other tiers in the hierarchy serve as a hierarchical cache.

Some other system designs make all tiers of memory addressable using application memory addresses of the software program. In such systems, the system's performance is impacted by the distribution of the software program's application memory among the multiple tiers of memory, i.e. among one or more memory components of the system. When the application memory of the software program comprises a plurality of application memory areas, performance may be improved when frequently accessed application memory areas are stored in one or more high performance memory components, whereas lower performance memory components are used for storing less frequently accessed application memory areas.

The term non-uniform memory access (NUMA) refers to a computerized system with more than one memory component, where some characteristics of memory access from a processing unit to a memory component, for example latency and additionally or alternatively throughput, depend on a topology of the system, for example a location of the memory component relative to the processing unit. In a manner similar to the systems described above, in a system with NUMA the system's performance may be impacted by the distribution of the software program's application memory among the one or more memory components.

SUMMARY

The present disclosure includes a description of an apparatus and a method for tracking memory accesses and managing memory. In some embodiments described herewithin, one or more memory tracking circuitries are used to update at least one statistical counter of a plurality of statistical counters in response to receiving a memory access command from a processing unit. Further in such embodiments, the one or more memory tracking circuitries are configured for providing one or more of the pluralities of statistical counters to a memory management component for the purpose of mapping application memory of the software program to a plurality of memory components connected to the processing unit. Updating the at least one statistical counter using one or more memory tracking circuitries reduces an amount of processing overhead required from the processing unit to track memory accesses and to manage allocation of a software program's application memory to the plurality of memory components, increasing performance of the apparatus.

The foregoing and other aspects are achieved by the features of the independent claims. Further implementation forms are apparent from the dependent claims, the description and the figures.

According to a first aspect, an apparatus for executing a software program comprises: a processing unit: at least one memory component, each connected to the processing unit and mapped to at least one range of memory addresses of a plurality of memory address ranges of the processing unit; and at least one memory tracking circuitry connected to the processing unit and to the at least one memory component, configured for: in each iteration of a plurality of iterations, updating at least one statistical counter of a plurality of statistical counters in response to receiving a memory access command from the processing unit; and providing one or more of the plurality of statistical counters to a memory management component for the purpose of mapping application memory of the software program to the at least one memory component.

According to a second aspect, a method for managing memory in an apparatus for executing one or more software programs comprises: in each iteration of a plurality of iterations updating, by at least one memory tracking circuitry connected to a processing unit and to at least one memory component connected to the processing unit, where each of the at least one memory component is mapped to at least one range of memory addresses of a plurality of memory address ranges of the processing unit, at least one statistical counter of a plurality of statistical counters in response to receiving a memory access command from the processing unit; and providing one or more of the plurality of statistical counters to a memory management component for the purpose of mapping application memory of a software program to the at least one memory component.

According to a third aspect, a software program product for memory management comprises: a non-transitory computer readable storage medium: program instructions for: in each management iteration of one or more management iterations, receiving from at least one memory tracking circuitry connected to a processing unit and to at least one memory component connected to the processing unit, where each of the at least one memory component is mapped to at least one range of memory addresses of a plurality of memory address ranges of the processing unit, one or more of a plurality of statistical counters for the purpose of mapping application memory of a software program to the at least one memory component. According to the third aspect the program instructions are executed by at least one computerized processor from the non-transitory computer readable storage medium.

According to a fourth aspect, a method for a memory management component comprises: in each management iteration of one or more management iterations, receiving from at least one memory tracking circuitry connected to a processing unit and to at least one memory component connected to the processing unit, where each of the at least one memory component is mapped to at least one range of memory addresses of a plurality of memory address ranges of the processing unit, one or more of a plurality of statistical counters for the purpose of mapping application memory of a software program to the at least one of memory component.

According to a fifth aspect, a memory tracking circuitry, comprising a plurality of statistical counters, comprises: a high access counter: a low access counter; and a plurality of range access counters. According to the fifth aspect, the memory tracking circuitry is configured for, when connected to a processing unit and to at least one memory component, each connected to the processing unit and mapped to at least one range of memory addresses of a plurality of memory address ranges of the processing unit, and when each of the plurality of range access counters is associated with one of the plurality of memory address ranges: in each iteration of a plurality of iterations, in response to receiving a memory access command from the processing unit: identifying a memory address in the memory access command; identifying a memory address range of the plurality of memory address ranges, where the memory address range comprises the memory address: incrementing the respective range access counter associated with the memory address range; and when the respective range access counter exceeds a high access threshold value, incrementing the high access counter; and providing one or more of the plurality of statistical counters to a memory management component for the purpose of mapping application memory of the software program to the at least one memory component.

In an implementation form of the first and second aspects, the plurality of statistical counters comprises at least one of: at least one watermark counter, selected from the group consisting of: a high access counter and a low access counter; and a plurality of range access counters each associated with one of the plurality of memory address ranges. Using at least one watermark counter in addition to the plurality of range access counters facilitates mitigating an amount of accesses to the plurality of range access counters, reducing an amount of computing resources required for memory management compared to methods that access all the plurality of range access counters. Optionally, at least one other of the plurality of statistical counters is implemented in the at least one memory tracking circuitry. Implementing a statistical counter in a memory tracking circuitry reduces an amount of computing resources required to track one or more memory accesses compared to methods that implement the statistical counter in a page table of an operating system executed by the processing unit executing the software program. Optionally, at least one yet other of the plurality of statistical counters is implemented in a cache memory component connected to one or more of the at least one memory component.

Optionally, at least one additional other of the plurality of statistical counters is implemented in one of the at least one memory component.

In another implementation form of the first and second aspects, updating the at least one statistical counter comprises: identifying a memory address in the memory access command: identifying a memory address range of the plurality of memory address ranges, where the memory address range comprises the memory address: incrementing the respective range access counter; and when the respective range access counter exceeds a high access threshold value, incrementing the high access counter. Incrementing the high access counter when the respective range access counter associated with the memory address range exceeds the high access threshold value facilitates mitigating an amount of accesses to the plurality of range access counters, reducing an amount of computing resources required for memory management compared to methods that access all the plurality of range access counters. Optionally, providing the one or more statistical counters to the memory management component comprises: providing the at least one watermark counter and in response to a request from the memory management component, providing at least one range access counter of the plurality of range access counters. Optionally, the memory management component is configured for: performing another analysis comprising the at least one watermark counter and sending a request to the at least one memory tracking circuitry to provide the at least one range access counter subject to another outcome of the other analysis. Providing the one or more statistical counters from the at least one memory tracking circuitry to the memory management component in more than one step and subject to performing the other analysis mitigates the amount of accesses to the plurality of range access counters, reducing an amount of computing resources required for memory management compared to methods that access all the plurality of range access counters, including reducing processing time, processing complexity and an amount of accesses to the at least one memory tracking circuitry. Optionally, the memory management component is further configured for configuring in the at least one memory tracking circuitry at least one of: the low access threshold value and the high access threshold value. Optionally, the memory management component configures in the at least one memory tracking circuitry at least one of: the low access threshold value and the high access threshold value, subject to yet another outcome of yet another analysis comprising the one or more statistical counters. Configuring the low access threshold value and additionally or alternatively the high access threshold increases accuracy of the high access counter and the low access counter, increasing accuracy of a memory mapping computed according to the one or more statistical counters.

In a further implementation form of the first and second aspects, the at least one memory tracking circuitry is configured for updating the at least one statistical counter and for providing the one or more of the plurality of statistical counters while the processing unit executes the software program. Updating the at least one statistical counter and providing the one or more statistical counters while the processing unit executes the software program facilitates runtime modification of a memory mapping of application memory of the software program, increasing system performance while executing the software program.

In a further implementation form of the first and second aspects, the at least one memory tracking circuitry comprises a plurality of local tracking circuitries. Optionally, each of the plurality of local tracking circuitries is connected to the processing unit and to one or more memory components of the at least one memory component and each local tracking circuitry of the plurality of local tracking circuitries updates the at least one statistical counter in response to receiving the memory access command when at least one memory address range of the plurality of memory address ranges associated with the one or more memory components connected to the local tracking circuitry comprises a local memory address that is a memory address in the memory address command. Using a plurality of local tracking circuitries increases usability of the method described herewithin in systems where the at least one memory component are topologically distant from each other.

In a further implementation form of the first and second aspects, the application memory of the software program comprises a plurality of application memory areas, each stored in one of the at least one memory components, and the mapping of the application memory by the memory management component comprises: performing an analysis comprising the one or more statistical counters; and moving at least one application memory area of the plurality of application memory areas from one of the at least one memory component to another of the at least one memory component in response to an outcome of the analysis. Optionally, the memory mapping component maps the application memory while the processing unit executes the software program. Moving, while the processing unit executes the software program, an application memory area from one memory component to another facilitates reducing an overall amount of latency of a plurality of memory accesses performed while executing the software program and additionally or alternatively increasing an overall bandwidth of the plurality of memory accesses, increasing performance of the apparatus executing the software program. Performing an analysis comprising the one or more statistical counters increases accuracy of the outcome of the analysis such that moving the at least one application memory area subject to the outcome of the analysis increases performance of the apparatus executing the software program compared to other methods of selecting a memory area that do not comprise one or more statistical counters collected while the processing unit executes the software program, for example methods that use static analysis of the software program.

In a further implementation form of the first and second aspects, the at least one memory tracking circuitry is further configured for: in each management iteration of one or more management iterations: executing the plurality of iterations, comprising updating the at least one statistical counter: providing the one or more statistical counters to the memory management component; and resetting one or more other of the plurality of statistical counters.

In a further implementation form of the first and second aspects, the memory management component comprises a software object executed by the processing unit. Optionally, the memory management component comprises a memory management circuitry connected to the at least one memory tracking circuitry and the at least one memory components. Using a memory management circuitry reduces an amount of computing resources of the processing unit required for memory management, reducing an impact the memory management has on the performance of the apparatus executing the software program.

In a further implementation form of the first and second aspects, the processing unit is configured for executing an operating system. Optionally, the operating system addresses the at least one memory component using a plurality of operating system memory pages, each having one of an identified set of page sizes and at least one identified memory address range of the plurality of memory address ranges has a range size that is not equal to any of the set of page sizes. Tracking a memory address range having a range size that is not equal to any of the set of page sized of the operating system increases accuracy of the analysis of the one or more statistical counters, and thus increases performance of the apparatus executing the software program.

In an implementation form of the fourth aspect, the plurality of statistical counters comprises at least one of a high access counter, a low access counter, and a plurality of range access counters each associated with one of the plurality of memory address ranges. Optionally, receiving the one or more statistical counters comprises receiving at least one of: the high access counter and the low access counter. Optionally, the method further comprises: performing an analysis comprising at least one of: the low access counter and the high access counter; and sending a request to the at least one memory tracking circuitry to provide the at least one range access counter subject to an outcome of the other analysis.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which implementations pertain. Although methods and materials similar or equivalent to those described herein can be used in the practice or testing of implementations, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

DETAILED DESCRIPTION

Figure 1:
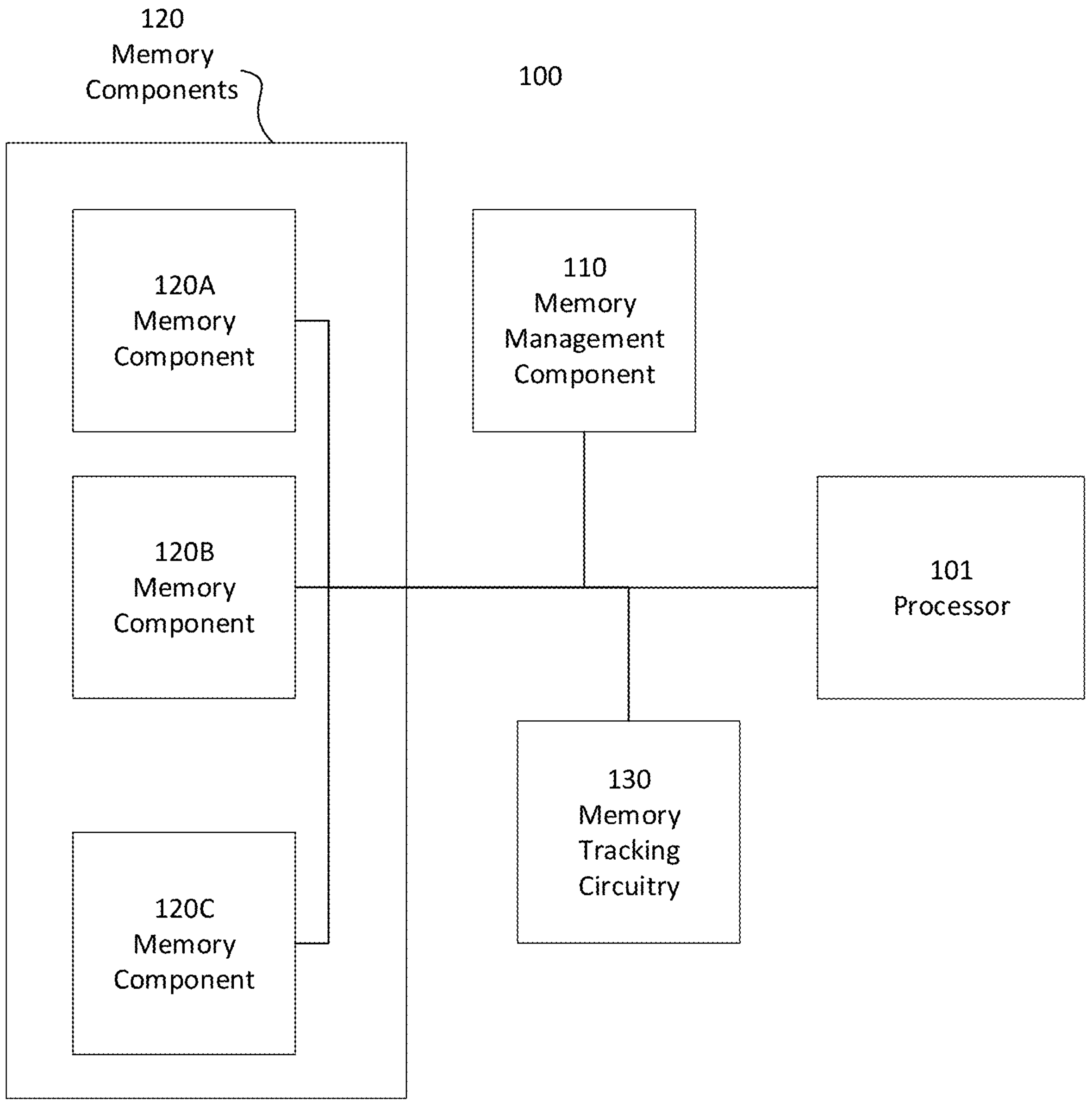
FIG. 1 is a schematic block diagram of an exemplary apparatus, according to some embodiments.

As used herewithin, the term "processing unit" refers to any kind of programmable or non-programmable circuitry that is configured to carry out the operations described below. The processing unit may comprise hardware as well as software. For example, the processing unit may comprise one or more processors and a transitory or non-transitory memory that carries a program which causes the processing unit to perform the respective operations when the program is executed by the one or more processors.

In addition, as used herewithin, the term "physical address" means an address used by the processing unit in a memory access request in order to access a memory component. In addition, as used herewithin, the term "application address" means an address used in an application. An application address may be a virtual address, in which case there is a need to translate the application address to a physical address for the purpose of accessing the one or more memory components. As used herewithin, the term "memory mapping" refers to mapping application memory addresses of a software program to physical addresses in a memory access request sent by the processing unit. Such a mapping may be used to translate an application address to a physical address identifying a location in a memory component where application data or instructions are stored.

In addition, as used herewithin, the terms "memory access request" and "memory access command" are both used to mean a request to access a memory component for the purpose of reading from, and additionally or alternatively writing to, the memory component, and the terms are used interchangeably. A memory access request may be generated when executing a computer instruction of the software program comprising a memory access computer instruction.

In addition, as used herewithin, the terms "range of memory addresses" and "memory address range" are both used to mean a range of memory addresses and are used interchangeably.

To allocate each of the plurality of application memory areas to one or more memory components connected to a processing unit such that performance of the system is improved, some systems track accesses to the one or more memory components. Some existing tracking methods maintain access counters in page tables used to map application addresses to physical addresses. Such methods require updating a counter in the page table every time memory is accessed. In addition, analysis of a plurality of counters in the page table requires merging counters of multiple virtual pages mapped to a common physical page. Some methods additionally require sorting the plurality of counters to classify the page table entries, for example to identify page table entries that describe high access application memory areas. Such methods reduce the performance of the system as they require computing resources of the processing unit.

In some other methods of tracking memory accesses the processing unit maintains a plurality of counters stored in one or more of the memory components. In systems implementing such methods, each memory access request from the processing unit requires two accesses from the processing unit to the memory-one for updating a counter, the other for accessing data in the memory, reducing effective throughput of the memory (i.e. access to application memory areas).

To reduce the amount of computer resources of the processing unit used to track a plurality of memory accesses, the present discloser, in some embodiments described herewithin, proposes using one or more memory management circuitries connected to the processing unit and to one or more memory components to update at least one statistical counter of a plurality of statistical counters in response to receiving a memory access command from the processing unit. Optionally, a statistical counter is indicative of a plurality of memory access commands. For example, when the processing unit has a plurality of memory address ranges and each of the one or more memory components is mapped to one or more of the plurality of memory address ranges, a statistical counter may be a range access counter associated with a memory address range, indicative of an amount of times the memory address range is accessed in a plurality of memory access commands. Optionally, a statistical counter is indicative of an amount of range access counters that meet an identified criterion. For example, a statistical counter may be a watermark counter, indicative of an amount of range access counters that exceed a high access threshold value, where the high access threshold value is indicative of an amount of accesses to a memory address range that is considered high. Alternatively, a watermark counter may be indicative of an amount of range access counters that are less than a low access threshold value, where the low access threshold value is indicative of another amount of accesses to a memory address range that is considered low. Optionally, a statistical counter is indicative of an amount of memory access commands received from the processing unit. Optionally, the one or more processing circuitries receive a memory access command in each of a plurality of iterations and update at least one statistical counter of the plurality of statistical counters in each of a plurality of iterations. Using one or more processing circuitries to update the at least one statistical counter reduces an amount of resources used by the processing unit to track a plurality of memory accesses, for example reduces an amount of memory accesses performed by the processing unit and additionally or alternatively reduces an amount of processor cycles of the processing unit used to compute the memory mapping. Reducing the amount of computing resources used by the processing unit increases performance of the system when executing the software program, for example by increasing throughput and additionally or alternatively reducing latency when performing one or more tasks of the software program.

Optionally, at least one of the plurality of statistical counters is implemented in the one or more memory tracking circuitries, further reducing an amount of accesses to the one or more memory components and thus increasing performance of the system.

In addition, in some embodiments the present disclosure proposes that the one or more memory tracking circuitries provide one or more of the plurality of statistical counters to a memory management component for the purpose of mapping application memory of the software program to the one or more memory components. Optionally, the memory management component performs an analysis of the one or more statistical counters for the purpose of mapping the application memory. Optionally, the memory management component comprises a software object executed by the processing unit. Optionally, the memory management component comprises other circuitry, optionally connected to the one or more memory tracking circuitries and the one or more memory components. Providing one or more of the statistical counters to the memory management component facilitates improving system performance by moving one or more application memory areas of the software program's plurality of application memory areas from one of the one or more memory components to another of the one or more memory components. For example, a range access counter of a range of memory addresses that exceeds the high access threshold value may indicate that the range of memory addresses is accessed frequently, and an application memory area of the plurality of application memory areas that is referenced by the range of memory addresses should be stored in a memory component having relatively higher performance access characteristics, for example low latency and additionally or alternatively high throughput. Similarly, another range access counter of another range of memory addresses that is below the low access threshold value may indicate that the other range of memory addresses is accessed rarely, and another application memory area of the plurality of application memory areas that is referenced by the other range of memory addresses should be stored in another memory component having relatively lower performance access characteristics, for example higher latency and additionally or alternatively lower throughput than the memory component having relatively higher performance access characteristics. Optionally, the memory mapping component maps the application memory while the processing unit executes the software program, optionally moving the one or more application memory areas while the processing unit executes the software program.

In some embodiments described herewithin the at least one memory component is a plurality of memory components, comprising at least two memory components. Optionally, the one or more memory tracking circuitries comprise a plurality of local tracking circuitries such that each local tracking circuitry of the plurality of local tracking circuitries is connected to one or more of the plurality of memory components. Optionally, each local tracking circuitry is connected to a subset of the plurality of memory components such that the local tracking circuitry is not connected to at least one of the plurality of memory components. Optionally, each local tracking circuitry updates the at least one statistical counter according to the one or more memory components connected thereto. i.e. in response to receiving the memory access command when at least one memory address range of the plurality of memory address ranges associated with the one or more memory components connected to the local tracking circuitry comprises a local memory address in the memory address command. When the processing unit is connected to the at least one memory component via a host memory controller, the local tracking circuitry connected to the at least one memory component is optionally additionally connected to the host memory controller.

Optionally, when the one or more memory tracking circuitries provide the one or more statistical counters to the memory management component, the one or more statistical counters comprise one or more watermark counters. Optionally, the memory management component performs another analysis of the one or more watermark counters, and subject to an outcome of the other analysis the memory management component optionally sends a request to the one or more memory tracking circuitries to provide at least one range access counter. For example, the memory management component may request the at least one range access counter only when the outcome of the other analysis indicates that a high watermark counter exceeds an identified threshold value. In this example, as long as the amount of ranges that experience high access is below the threshold value there may be no need to move a memory area. This requires fewer computing resources compared to some other methods, where there is a need to read all the plurality of range access counters to identify that there is no need to move a memory area. In another example, the memory management component may request one or more range access counters until receiving an amount of range access counters that exceed the high watermark threshold value that is equal to the high watermark counter. In this example, identifying all memory areas experiencing high access rates may be achieved without reading all the plurality of memory counters, requiring fewer computing resources than some other methods that do not use a watermark counter.

When the processing unit executes an operating system, the operating system may address the plurality of memory components using a plurality of operating system memory pages. It is common practice not to use arbitrary page sizes for the plurality of operating system memory pages. i.e. each of the plurality of operating system memory pages has one of an identified set of page sizes. When memory access tracking is done using a page table of the operating system, granularity of the memory access tracking is according to the respective page size of each of the plurality of operating system memory pages. In some embodiments described herewithin, at least one identified memory address range of the plurality of memory address ranges has a range size that is not equal to any of the set of page sizes. Using one or more memory tracking circuitries to track the plurality of memory access commands according to the plurality of memory address ranges allows tracking the plurality of memory access commands at a granularity that is different from a page size of the operating system, increasing accuracy of a memory mapping computed according to the plurality of statistical counters compared to a memory mapping computed when tracking is according to an operating system page size and thus increases accuracy of allocation of the plurality of application memory areas to the one or more memory components, increasing performance of the system.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code, natively compiled or compiled just-in-time (JIT), written in any combination of one or more programming languages, including an object oriented programming language such as Smalltalk. C++. Java. Object-Oriented Fortran or the like, an interpreted programming language such as JavaScript. Python or the like, and conventional procedural programming languages, such as the "C" programming language. Fortran, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, showing a schematic block diagram of an exemplary apparatus 100, according to some embodiments. In such embodiments, a processing unit 101 is connected to at least one memory component 120.

For brevity, henceforth the term "memory components 120" is used to mean "at least one memory components 120, and the terms are used interchangeably. Optionally, the memory components 120 comprise one memory component, for example memory component 120C. Optionally, the memory components 120 comprise more than one memory component, for example memory component 120A, memory component 120B and memory component 120C. A memory component may be a random access memory (RAM) component, for example an SRAM component or a DRAM component. Other examples of a memory component include a read only memory (ROM) component, an electrically erasable programmable ROM (EEPROM) and a non-volatile RAM (NVRAM). Optionally, one or more of the memory components 120 is electrically coupled to the processing unit 101. Optionally, one or more of the memory components 120 is connected to the processing unit 101 via a host memory controller (not shown).

Optionally, one or more of the memory components 120 is a cache memory component of the processing unit 101. Optionally, one or more of the memory components 120 are connected to another cache memory component (not shown), connected additionally to the processing unit 101.

Optionally, one or more memory tracking circuitry 130 is connected to the processing unit 101 and the memory components 120.

Figure 2:
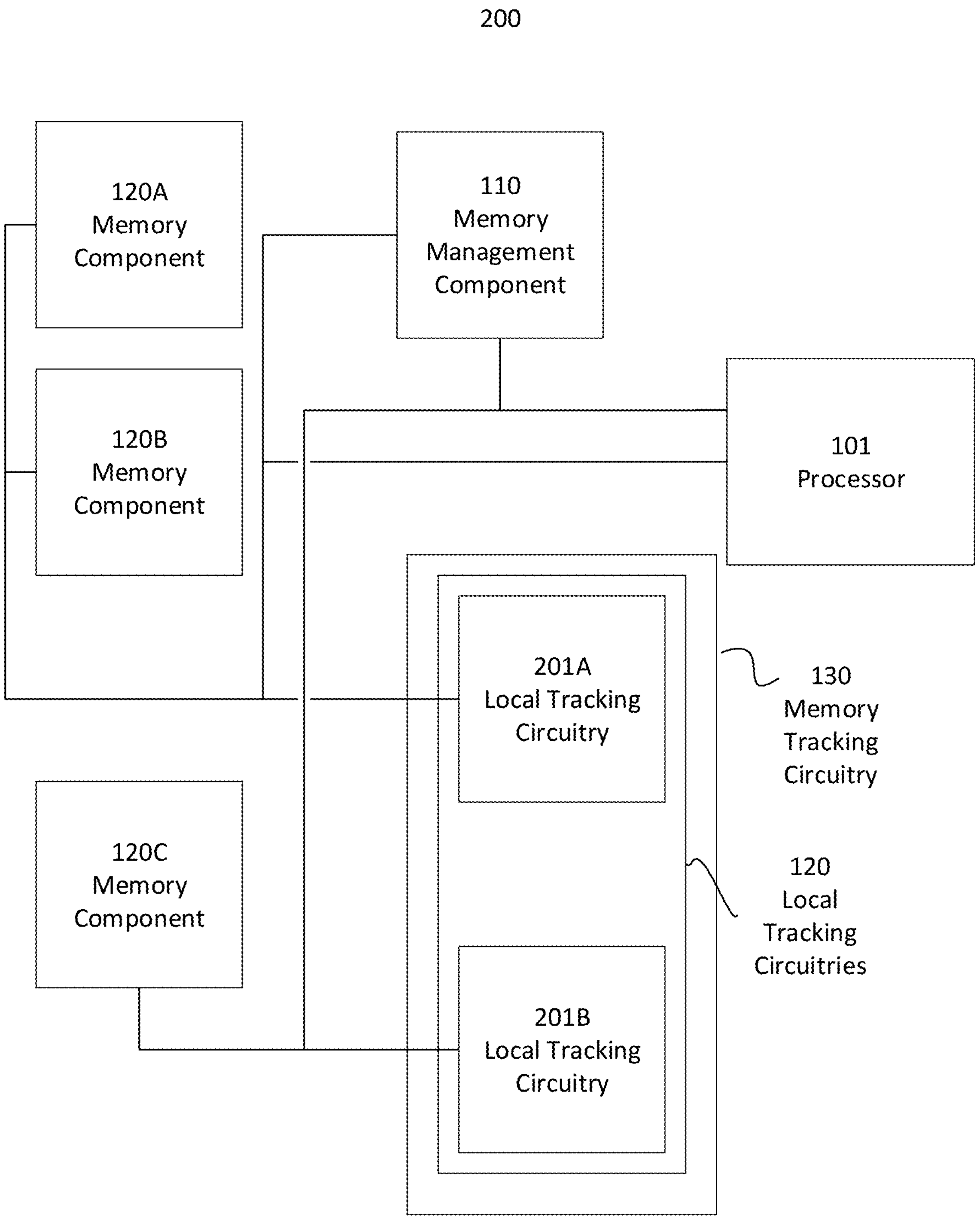
FIG. 2 is a schematic block diagram of another exemplary apparatus, according to some embodiments.

Reference is now made also to FIG. 2, showing a schematic block diagram of another exemplary apparatus 200, according to some embodiments. In such embodiments, the one or more memory tracking circuitry 130 comprises a plurality of local tracking circuitries 201, for example comprising local tracking circuitry 201A and local tracking circuitry 201B. Optionally, each of the plurality of local tracking circuitries 201 is connected to one or more of the memory components 120. Optionally, each of the plurality of local tracking circuitries is connected to a subset of the memory components 120, such that each of the plurality of local tracking circuitries 201 is not connected to at least one of the memory components 120. In this example, local tracking circuitry 201A is connected to memory component 120A and memory component 120B and is not connected to memory component 120C. Additionally in this example, local tracking circuitry 201B is connected to memory component 120C and is not connected to and memory component 120A and memory component 120B. Optionally, each of the plurality of local tracking circuitries 201 is connected to exactly one of the memory components 120.

Reference is now made again to FIG. 1. Optionally, each of the memory components 120 is mapped to at least one range of memory addresses of a plurality of memory address ranges of the processing unit 101.

Figure 3:
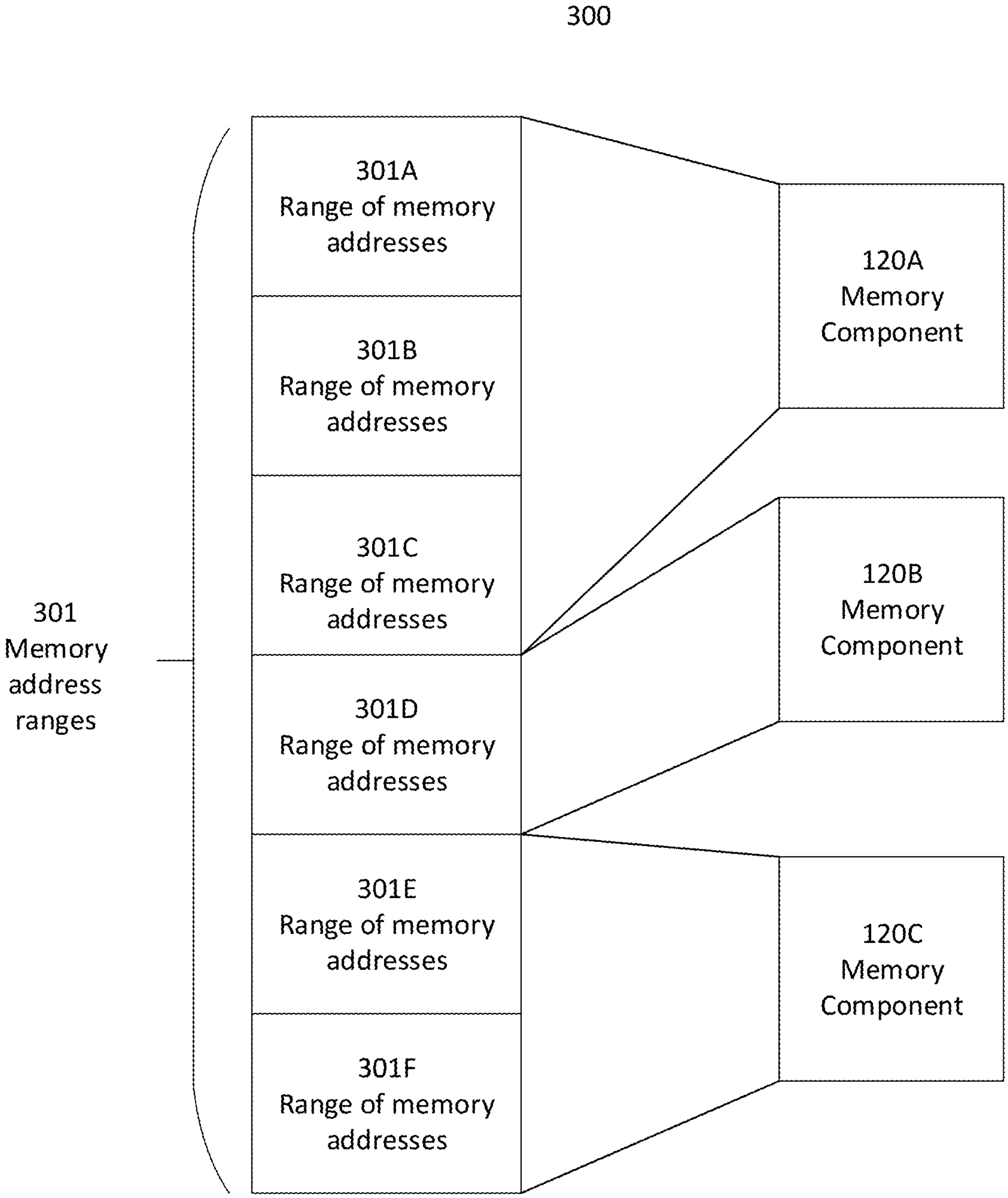
FIG. 3 is a schematic block diagram of an exemplary address mapping, according to some embodiments.

Reference is now made also to FIG. 3, showing a schematic block diagram of an exemplary address mapping 300, according to some embodiments. In this example, memory component 120A is mapped to range of memory addresses 301A, range of memory addresses 301B and range of memory addresses 301C of plurality of memory address ranges 301. Thus, when the processing unit 101 accesses a memory address in one of range of memory addresses 301A, range of memory addresses 301B and range of memory addresses 301C the processing unit 101 accesses memory component.

Similarly, memory component 120B is mapped to range of memory addresses 301D of plurality of memory address ranges 301, and memory component 120C is mapped range of memory addresses 301E and range of memory addresses 301F of plurality of memory address ranges 301.

Optionally, the processing unit 101 executes an operating system that addresses the memory components 120 using a plurality of operating system memory pages. Optionally each of the plurality of operating system memory pages has a page size that is one of an identified set of page sizes. Optionally, at least one of the plurality of memory address ranges 301 has a size that not a member of the identified set of page sizes.

Reference is now made again to FIG. 1. Optionally, one or more memory tracking circuitry 130 are connected to memory management component 110. Optionally, the memory management component 110 comprises a software object executed by the processing unit 101. Optionally, the memory management component 110 comprises a memory management circuitry additionally connected to the processing unit 101 and the memory components 120.

To track memory access commands and manage memory, the following optional method may be implemented by system 100 or system 200, according to some embodiments.

Figure 4:
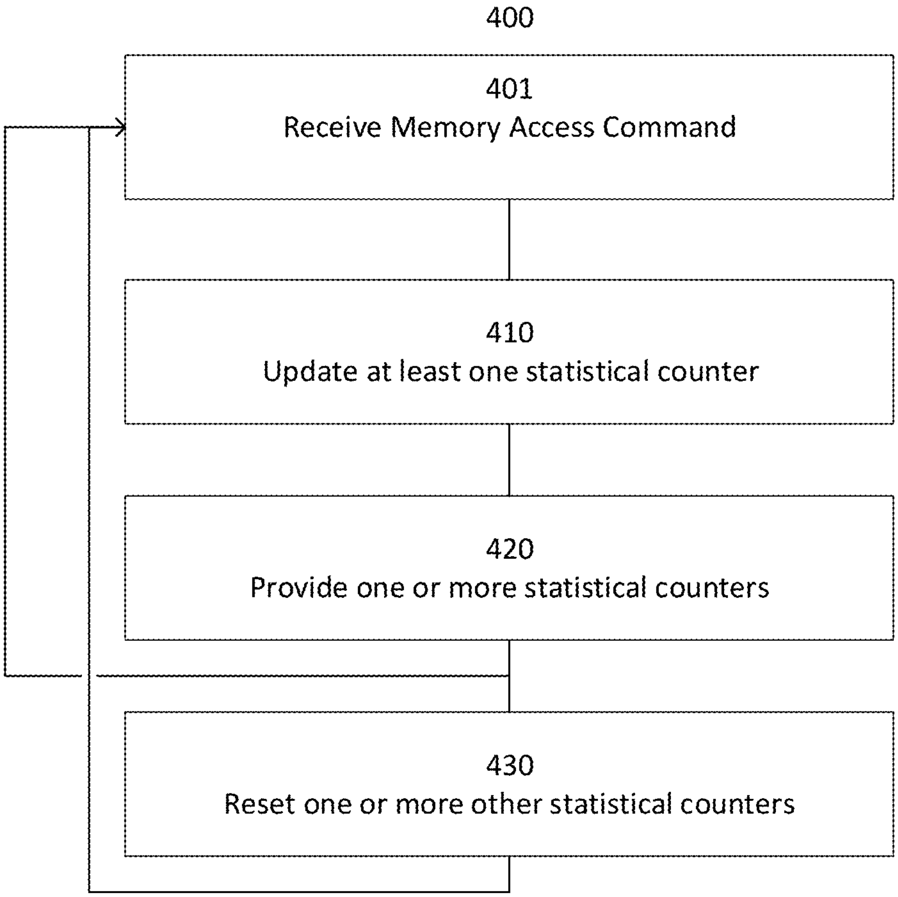
FIG. 4 is a flowchart schematically representing an optional flow of operations for managing memory, according to some embodiments.

Reference is now made also to FIG. 4, showing a flowchart schematically representing an optional flow of operations 400 for managing memory, according to some embodiments. In such embodiments, in 401 the one or more memory tracking circuitry 130 receives from the processing unit 101 a memory access command comprising a memory address. Optionally the memory address is in one of the plurality of memory address ranges 301. For example, when the memory address is in the range of memory addresses 301E the memory address is a local memory address of the memory component 120C. In this example, the range of memory addresses 301E comprises a local memory address of the memory component 120C that is the memory address in the memory access command. Optionally, the processing unit 101 sends the memory access command when executing a software program, optionally for the purpose of accessing application memory of the software program.

In 410, the one or more memory tracking circuitry 130 optionally updates at least one statistical counter of a plurality of statistical counters. Optionally, the plurality of statistical counters comprises a plurality of range access counters, each associated with one of the plurality of memory address ranges 301. Optionally, the plurality of statistical counters comprises one or more watermark counters, each associated with a frequency of accesses to a memory component. A watermark counter may be indicative of an amount of memory access ranges that are accessed at the frequency associated with the watermark counter. A watermark counter may be a high access counter, indicative of an amount of range access counters of the plurality of range access counters that exceed a high access threshold value, indicating frequent access to the respective memory components associated with the range access counters that exceed the high access threshold value. For example, a range access counter of range of memory addresses 301F exceeding the high access threshold value may indicate frequent access to the memory component 120C associated with range of memory addresses 301F. Another example of a watermark counter is a low access counter, indicative of an amount of range access counters of the plurality of range access counters that exceed a low access threshold value. There may be more than two watermark counters, each associated with one of a plurality of access frequencies to a memory component. Each watermark counter of the more than two watermark counters may be associated with an access threshold value indicative of the access frequency associated thereby. i.e. is indicative of an amount of range access counters of the plurality of range access counters that exceeds the threshold value associated with the watermark counter.

Optionally, at least one of the plurality of statistical counters is implemented in the one or more memory tracking circuitry 130. Optionally, at least one other of the plurality of statistical counters is implemented in one of the memory components 120. Optionally, the one memory component implementing the at least one other statistical counter is a cache memory component of the processing unit 101. Optionally, the at least one other of the plurality of statistical counters is implemented in another cache memory component connected to one or more of the memory components 120.

Figure 5:
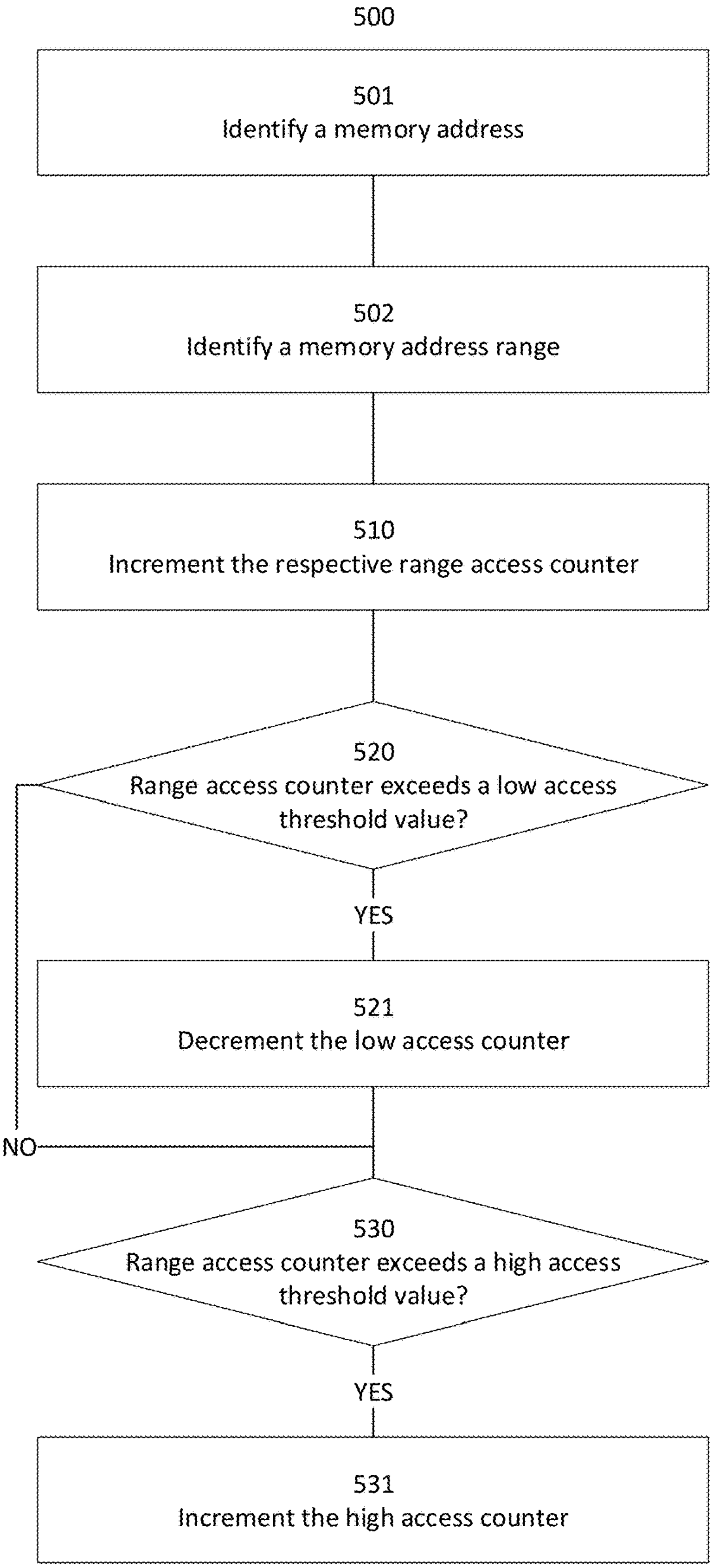
FIG. 5 is a flowchart schematically representing an optional flow of operations for updating statistical counters, according to some embodiments.

Reference is now made also to FIG. 5, showing a flowchart schematically representing an optional flow of operations 500 for updating statistical counters, according to some embodiments. In such embodiments, in 501 the one or more memory tracking circuitry 130 identifies a memory address in the memory access command received in 401. In 502, the one or more memory tracking circuitry 130 optionally identifies a memory address range of the plurality of memory address ranges 301 where the memory address range comprises the memory address. For example, the memory command may comprise a memory address in the range of memory addresses 301F. In this example, the one or more memory tracking circuitry 130 identifies range of memory addresses 301F. Optionally, in 510, the one or more memory tracking circuitry 130 increments the respective range access counter of the plurality of range access counters that is associated with range of memory addresses 301F. When the one or more memory tracking circuitries 130 comprises plurality of local tracking circuitries 201, each local tracking circuitry of the plurality of local tracking circuitries 201 updates the at least one statistical counter when at least one memory address range of the plurality of memory address ranges 301 that is associated with the one or more memory components connected to the local tracking circuitry comprises the memory address of the memory access command. For example, when the local tracking circuitry 201B identifies that the memory address of the memory access command is in the range of memory addresses 301F that is associated with memory component 120C connected to the local tracking circuitry 201B, the local tracking circuitry 201B may update the one or more statistical counters.

In 520, the one or more memory tracking circuitry 130 optionally determines whether the respective range access counter associated with range of memory addresses 301F exceeds a low access threshold value, and subject to determining that the respective range access counter associated with range of memory addresses 301F exceeds the low access threshold value, in 521 the one or more memory tracking circuitry 130 optionally decrements the low access counter. In 530, the one or more memory tracking circuitry 130 optionally determines whether the respective range access counter associated with range of memory addresses 301F exceeds a high access threshold value, and subject to determining that the respective range access counter associated with range of memory addresses 301F exceeds the high access threshold value, in 531 the one or more memory tracking circuitry 130 optionally increments the high access counter. When the one or more watermark counters comprise more than two watermark counters, the one or more tracking circuitry 130 optionally determines for each of the more than two watermark counters whether the respective range access counter associated with range of memory addresses 301F exceeds a threshold value associated with the watermark counter, and subject to determining that the respective range access counter associated with range of memory addresses 301F exceeds the threshold value associated with the watermark counter the one or more memory tracking circuitry 130 optionally increments the watermark counter.

Reference is now made again to FIG. 4. Optionally, the one or more memory tracking circuitry 130 executes 401 and 410 while the processing unit 101 executes the software program. Optionally, the one or more memory tracking circuitry 130 repeats 401 and 410 in each of a plurality of iterations.

In 420, the one or more memory tracking circuitry 130 optionally provides one or more of the plurality of statistical counters to the memory management component 110, optionally for the purpose of mapping application memory of the software program to the memory components 120. Optionally, the one or more memory tracking circuitries 130 provides the one or more statistical counters while the processing unit 101 executes the software program. Optionally, the memory mapping component 110 maps the application memory to the memory components 120 while the processing unit 101 executes the software program.

Figure 6:
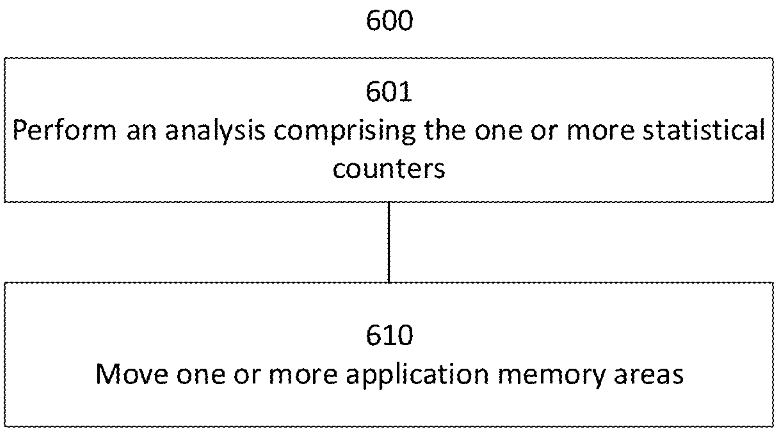
FIG. 6 is a flowchart schematically representing an optional flow of operations for memory management, according to some embodiments.

Reference is now made also to FIG. 6. Showing an optional flow of operations 600 for memory management, according to some embodiments. In such embodiments, in 601 the memory management component 110 performs an analysis of the one or more statistical counters. Following is exemplary, non-mandatory, method for performing the analysis.

Figure 7:
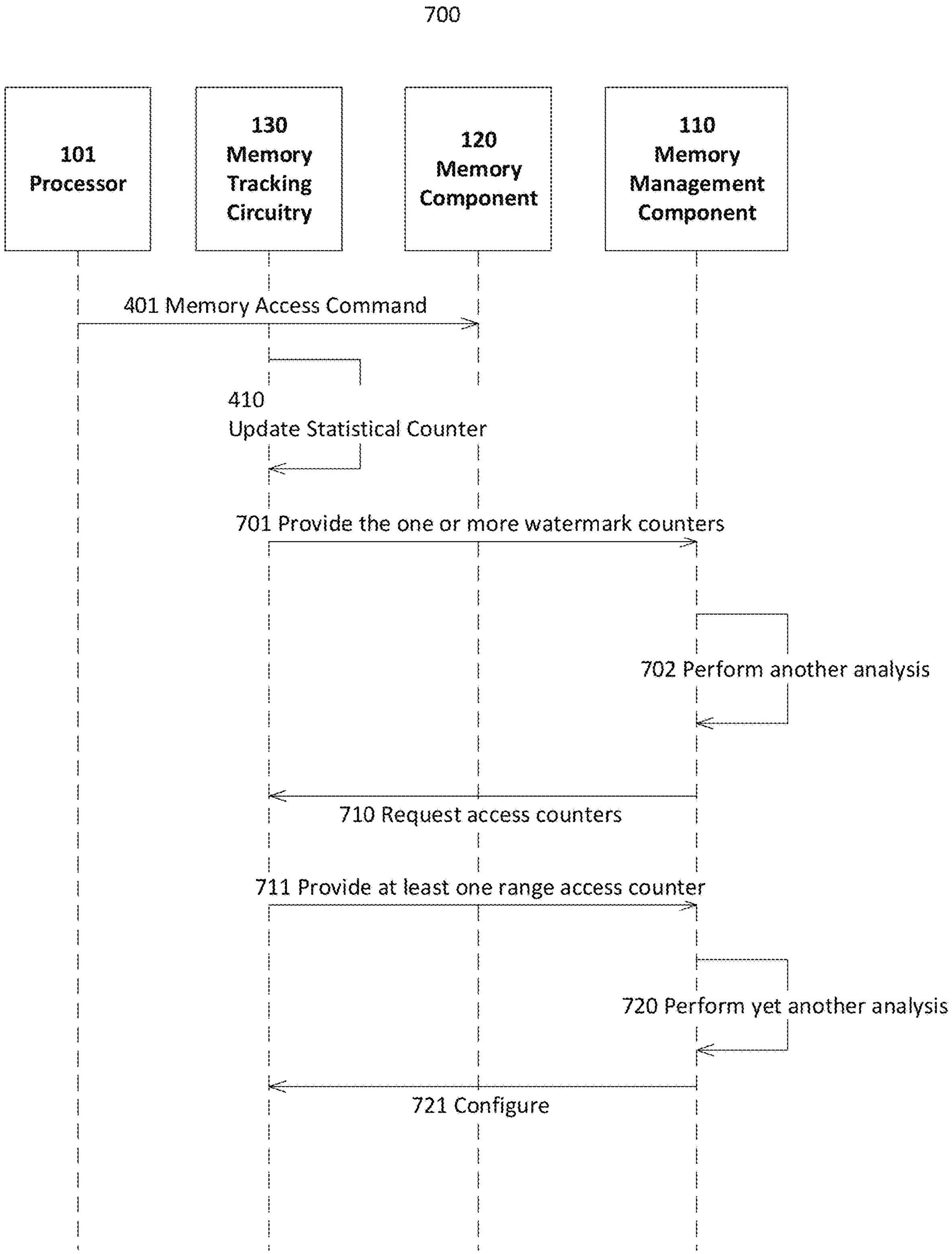
FIG. 7 is a sequence diagram of an optional flow of operations, according to some embodiments.

Reference is now made also to FIG. 7, showing a sequence diagram of an optional flow of operations 700, according to some embodiments. In such embodiments, in 701 the one or more memory tracking circuitries 130 provide the one or more watermark counters to the memory management component 110. Optionally, the one or more memory tracking circuitries 130 provide in 701 a subset of the one or more watermark counters, for example only one of the one or more watermark counters. Optionally, the one or more watermark counters include a high access counter. Optionally, the one or more watermark counters include a low access counter. In 702, the one or more memory tracking circuitries 130 performs another analysis comprising the one or more watermark counters. Subject to an outcome of the other analysis, in 710 the memory management component 110 optionally sends in 710 a request to the one or more memory tracking circuitries 130 to provide at least one range access counter of the plurality of range access counters. For example, when the outcome of the other analysis indicates that a watermark counter exceeds a frequency threshold value the memory mapping component may request the at least one range access counters in order to identify which of the plurality of memory address ranges is accessed frequently. On the other hand, when the outcome of the other analysis indicates that the watermark counter does not exceed the frequency threshold value, the memory mapping component 110 may decline performing another analysis and decline modifying a mapping of the application memory of the software program. The other analysis may use one of the one or more watermark counters, for example when only one watermark counter is implemented. The other analysis may use more than one of the one or more watermark counters. When the one or more watermark counters comprise at least one of the low access counter and the high access counter, the other analysis optionally comprises the at least one of the low access counter and the high access counter.

In response to receiving the request from the memory management component 110, in 711 the one or more memory tracking circuitries 130 optionally sends the memory management component 110 the at least one range access counter. Optionally. 710 and 711 are repeated in a plurality of reading iterations. Optionally, in 711 the one or more memory tracking circuitries 130 sends the memory management component 110 one range access counter, such that the memory management component 110 accesses the one or more range access counters one at a time. Optionally, in each execution of 711 the one or more memory tracking circuitries 130 sends the memory management component 110 a subset of the plurality of range access counters. Optionally, the management component 110 declines to execute 710 subject to identifying a stop condition, for example receiving an amount of range access counters exceeding a threshold value that is equal to a value of the watermark counter provided in 701.

Reference is now made also to FIG. 6. The memory management component 110 optionally performs one or more memory management tasks subject to an outcome of the analysis performed in 601, for example mapping application memory of the software program. Another example of a memory management task is configuring the one or more memory tracking circuitries 130.

Figure 8:
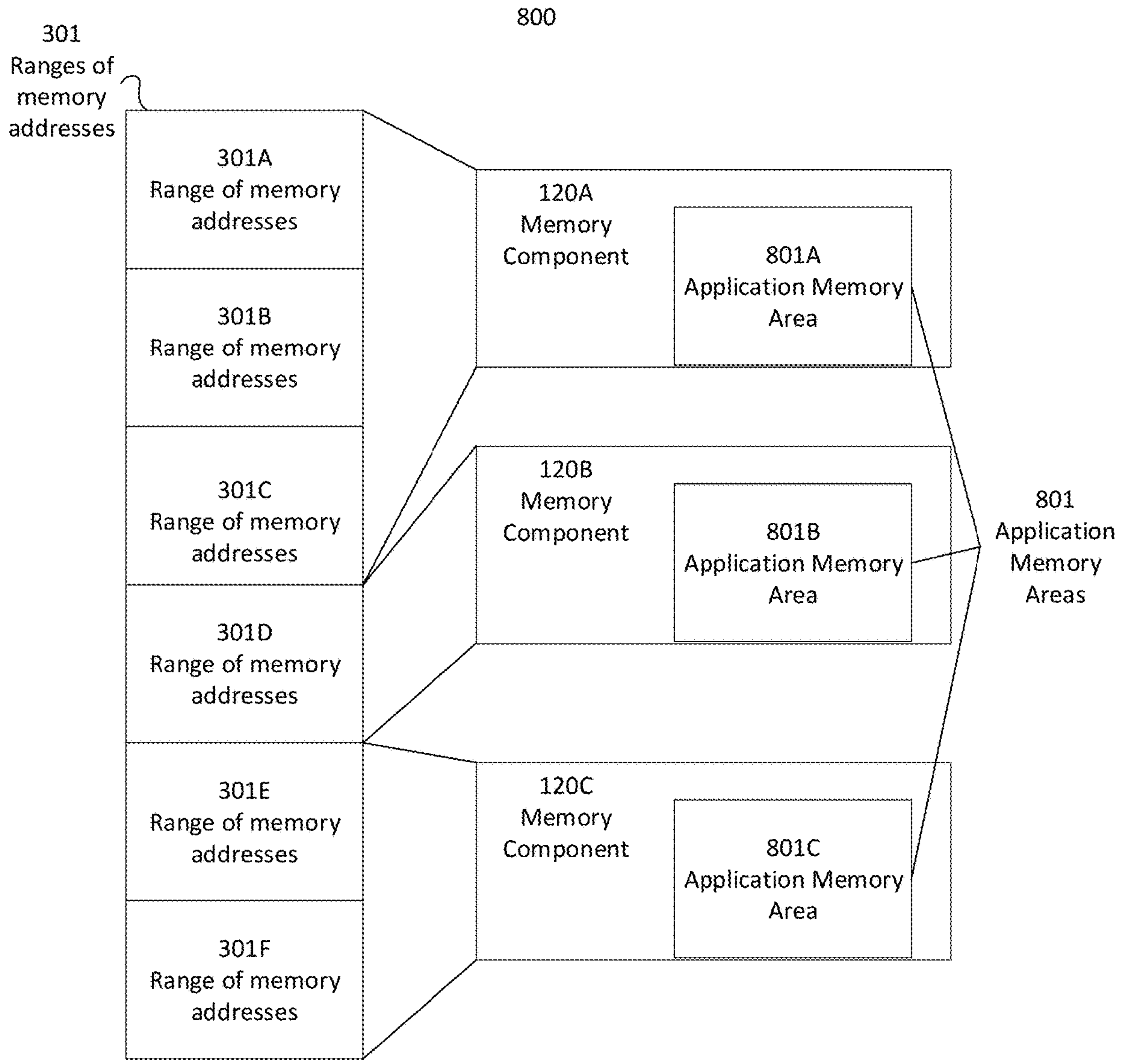
FIG. 8 is a schematic block diagram of an exemplary memory mapping, according to some embodiments.

Reference is now made also to FIG. 8, showing a schematic block diagram of an exemplary memory mapping 800, according to some embodiments. Optionally, the application memory of the software program comprises a plurality of application memory areas 801, for example including memory application area 801A, memory application area 801B and memory application area 801C. Optionally, each of the plurality of memory application areas is stored in one of the memory components 120. For example, application memory area 801A may be stored in memory component 120A, application memory area 801B may be stored in memory component 120B and application memory area 801C may be stored in memory component 120C.

Reference is now made again to FIG. 6. In 610, in response to the analysis performed in 601 (for example, using method 700), the memory management component 110 may move one or more application memory areas of the plurality of application memory areas 801 from one of the memory components 120 to another of the memory components 120.

Figure 9:
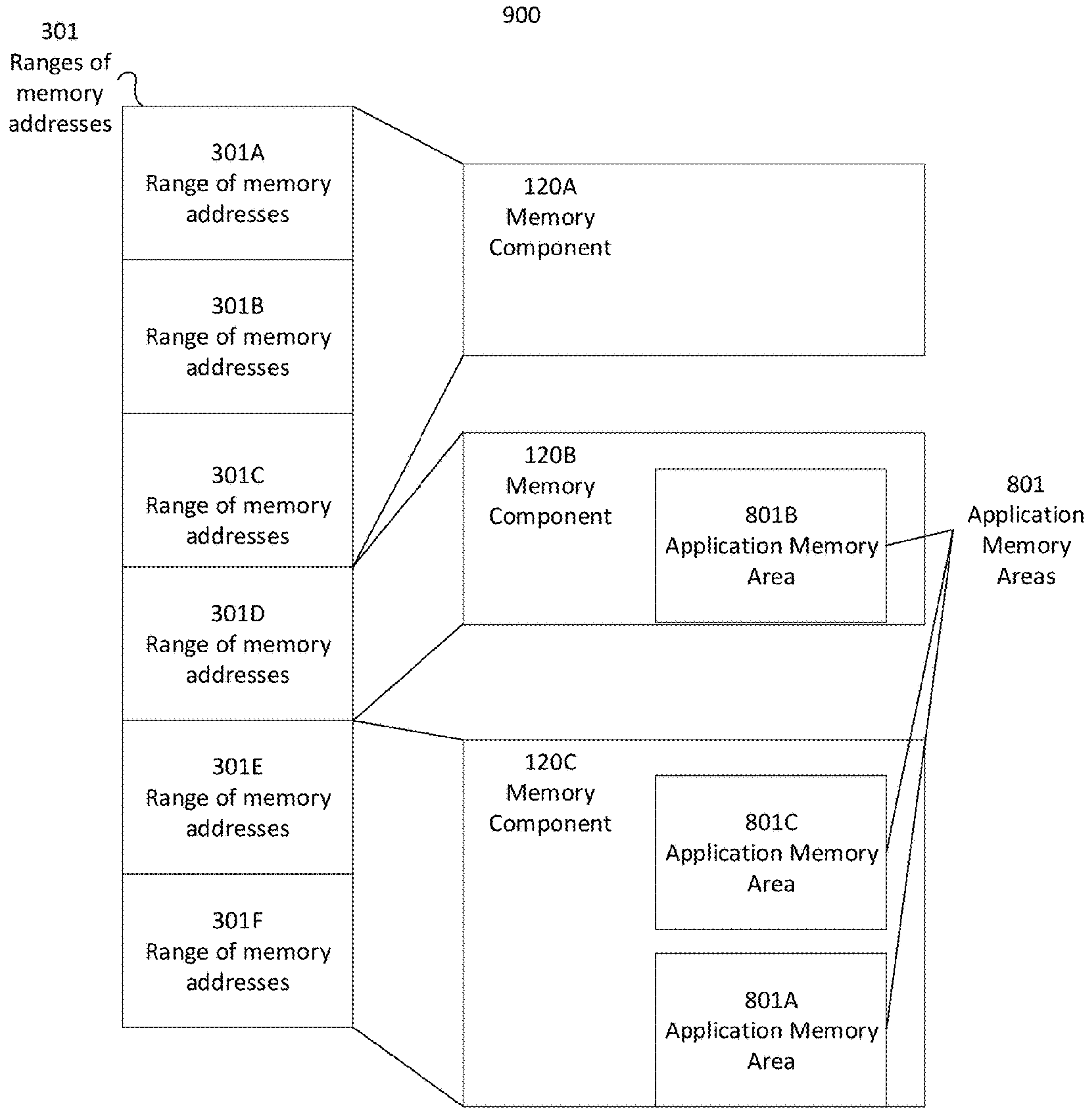
FIG. 9 is a schematic block diagram of another exemplary memory mapping, according to some embodiments.

Reference is now made also to FIG. 9, showing a schematic block diagram of another exemplary memory mapping 900, according to some embodiments. In this example, an outcome of the analysis may be that the memory management component 110 moves application memory areas 801A from memory component 120A to memory component 120C, for example, when memory component 120C has higher performance access characteristics than memory component 120A and the outcome of the analysis indicates high frequency access to application memory area 801A. Optionally, the memory management component 110 updates a mapping between the application memory and one or more of the plurality of memory address ranges 301, for example in a page table of an operating system executed by the processing unit 101.

Reference is now made again to FIG. 7. In 721, the memory management component 110 optionally configures one or more watermark threshold values in the one or more memory tracking circuitries 130, for example the high watermark threshold value or the low watermark threshold value. Optionally, in 720 the memory management component 110 performs yet another analysis of the one or more statistical counters and executes 721 subject to yet another outcome of the yet another analysis. For example, when a memory component having high performance access characteristics is underused, the memory management component 110 may lower the high watermark threshold value. Similarly, when the memory component having high performance access characteristics is overused, the memory management component 110 may raise the high watermark threshold value.

Reference is now made again to FIG. 4. In 430, the one or more memory tracking circuitries 130 optionally resets one or more other counters of the plurality of statistical counters. For example, the one or more memory tracking circuitries 130 may reset a statistical counter after providing the statistical counter to the memory management component 110 in 420. Resetting a counter may be setting the counter to 0). Resetting the counter may be setting the counter to an initial value. For example, a low access counter may start with a value equal to the amount of memory components in memory components 120, and be decremented in 521 for each range access counter that exceeds the low watermark threshold value.

Optionally, the one or more memory tracking circuitries 130 repeat execution of the plurality of iteration, comprising 401 and 410, providing the one or more statistical counters in 420 and resetting the one or more other counters in each of a plurality of management iterations.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant memory tracking circuitries will be developed and the scope of the term memory tracking circuitry is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases “ranging/ranges between” a first indicate number and a second indicate number and “ranging/ranges from” a first indicate number “to” a second indicate number are used herein interchangeably and are meant to include the first and second indicated numbers and all the fractional and integral numerals there between.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present disclosure. To the extent that section headings are used, they should not be construed as necessarily limiting. In addition, any priority document(s) of this application is/are hereby incorporated herein by reference in its/their entirety.

What is claimed is:

1. A method for managing memory in an apparatus for executing one or more software programs, comprising:
- in each iteration of a plurality of iterations updating, by at least one memory tracking circuitry connected to a processing unit and to at least one memory component connected to the processing unit, where each of the at least one memory component is mapped to at least one range of memory addresses of a plurality of memory address ranges of the processing unit, at least one statistical counter of a plurality of statistical counters in response to receiving a memory access command from the processing unit; and
- providing one or more of the plurality of statistical counters to a memory management component for the purpose of mapping application memory of a software program to the at least one memory component,
- wherein in each management iteration of one or more management iterations, the method further comprises:
  - executing, by the at least one memory tracking circuitry, the plurality of iterations, comprising updating the at least one statistical counter;
  - providing the one or more statistical counters to the memory management component; and
  - resetting the one or more statistical counters of the plurality of statistical counters.

2. The method of claim 1, wherein the plurality of statistical counters comprises at least one of:
- at least one watermark counter, selected from the group consisting of: a high access counter and a low access counter; and
- a plurality of range access counters each associated with one of the plurality of memory address ranges.

3. A method for a memory management component, comprising:
- in each management iteration of one or more management iterations, receiving from at least one memory tracking circuitry connected to a processing unit and to at least one memory component connected to the processing unit, where each of the at least one memory component is mapped to at least one range of memory addresses of a plurality of memory address ranges of the processing unit, one or more of a plurality of statistical counters for the purpose of mapping application memory of a software program to the at least one of memory component,
- wherein the at least one memory tracking circuitry is further configured for:
  - in each management iteration of one or more management iterations:
  - executing the plurality of iterations, comprising updating the one or more statistical counters of the plurality of statistical counters;
  - providing the one or more statistical counters to the memory management component; and
  - resetting the one or more statistical counters.

4. The method of claim 3, wherein the plurality of statistical counters comprises at least one of a high access counter, a low access counter, and a plurality of range access counters each associated with one of the plurality of memory address ranges;
- wherein receiving the one or more statistical counters comprises receiving at least one of: the high access counter and the low access counter; and
- wherein the method further comprises:
  - performing an analysis comprising at least one of: the low access counter and the high access counter; and
  - sending a request to the at least one memory tracking circuitry to provide the at least one range access counter subject to an outcome of the other analysis.

5. An apparatus for executing a software program, comprising:
- a processing unit:
- at least one memory component connected to the processing unit and mapped to at least one range of memory addresses of a plurality of memory address ranges of the processing unit; and
- at least one memory tracking circuitry connected to the processing unit and to the at least one memory component, configured for:
  - in each iteration of a plurality of iterations, updating at least one statistical counter of a plurality of statistical counters in response to receiving a memory access command from the processing unit; and
  - providing one or more of the plurality of statistical counters to a memory management component for the purpose of mapping application memory of the software program to the at least one memory component, wherein the at least one memory tracking circuitry is further configured for:

in each management iteration of one or more management iterations:

executing the plurality of iterations, comprising updating the at least one statistical counter;

providing the one or more statistical counters to the memory management component; and resetting the one or more statistical counters of the plurality of statistical counters.

6. The apparatus of claim 5, wherein the plurality of statistical counters comprises at least one of:

at least one watermark counter, selected from the group consisting of: a high access counter and a low access counter; and a plurality of range access counters each associated with one of the plurality of memory address ranges.

7. The apparatus of claim 6, wherein updating the at least one statistical counter comprises:

identifying a memory address in the memory access command;

identifying a memory address range of the plurality of memory address ranges, where the memory address range comprises the memory address:

incrementing the respective range access counter associated with the memory address range; and determining when the respective range access counter exceeds a high access threshold value, and in response to determining that the respective range access counter exceeds a high access threshold value, incrementing the high access counter.

8. The apparatus of claim 7, wherein providing the one or more statistical counters to the memory management component comprises:

providing the at least one watermark counter; and in response to a request from the memory management component, providing at least one range access counter of the plurality of range access counters; and wherein the memory management component is configured for:

performing another analysis comprising the at least one watermark counter; and sending a request to the at least one memory tracking circuitry to provide the at least one range access counter subject to another outcome of the other analysis.

9. The apparatus of claim 7, wherein the memory management component is further configured for configuring in the at least one memory tracking circuitry at least one of: the low access threshold value and the high access threshold value.

10. The apparatus of claim 9, wherein the memory management component configures in the at least one memory tracking circuitry at least one of: the low access threshold value and the high access threshold value, subject to yet another outcome of yet another analysis comprising the one or more statistical counters.

11. The apparatus of claim 5, wherein at least one other of the plurality of statistical counters is implemented in the at least one memory tracking circuitry.

12. The apparatus of claim 5, wherein at least one of the plurality of statistical counters is implemented in a cache memory component connected to one or more of the at least one memory component.

13. The apparatus of claim 5, wherein at least one additional other of the plurality of statistical counters is implemented in one of the at least one memory component.

14. The apparatus of claim 5, wherein the at least one memory tracking circuitry comprises a plurality of local tracking circuitries:

wherein each of the plurality of local tracking circuitries is connected to the processing unit and to one or more memory components of the at least one memory component; and wherein each local tracking circuitry of the plurality of local tracking circuitries updates the at least one statistical counter in response to receiving the memory access command when at least one memory address range of the plurality of memory address ranges associated with the one or more memory components connected to the local tracking circuitry comprises a local memory address that is a memory address in the memory address command.

15. The apparatus of claim 5, wherein the application memory of the software program comprises a plurality of application memory areas, each stored in one of the at least one memory components; and wherein the mapping of the application memory by the memory management component comprises:

performing an analysis comprising the one or more statistical counters; and moving at least one application memory area of the plurality of application memory areas from one of the at least one memory component to another of the at least one memory component in response to an outcome of the analysis.

16. The apparatus of claim 15, wherein the memory mapping component maps the application memory while the processing unit executes the software program.

17. The apparatus of claim 5, wherein the at least one memory tracking circuitry is configured for updating the at least one statistical counter and for providing the one or more of the plurality of statistical counters while the processing unit executes the software program.

18. The apparatus of claim 5, wherein the memory management component comprises a software object executed by the processing unit.

19. The apparatus of claim 5, wherein the memory management component comprises a memory management circuitry connected to the at least one memory tracking circuitry and the at least one memory components.

20. The apparatus of claim 5, wherein the processing unit is configured for executing an operating system;

wherein the operating system addresses the at least one memory component using a plurality of operating system memory pages, each having one of an identified set of page sizes; and wherein at least one identified memory address range of the plurality of memory address ranges has a range size that is not equal to any of the set of page sizes.

* * * * *